United States Patent [19]

Miller

[11] 4,147,892
[45] Apr. 3, 1979

[54] SPEAKERPHONE WITH DYNAMIC LEVEL DISCRIMINATOR

[75] Inventor: Eric M. Miller, Sunnyvale, Calif.
[73] Assignee: Tridar, Los Altos, Calif.
[21] Appl. No.: 873,142
[22] Filed: Jan. 30, 1978
[51] Int. Cl.² ............................................. H04M 1/60
[52] U.S. Cl. .................................. 179/1 HF; 179/1 P; 179/1 VL
[58] Field of Search ................ 179/1 HF, 1 H, 1 VC, 179/1 VL, 1 SC, 1 P; 325/304

[56] References Cited
U.S. PATENT DOCUMENTS 3,751,602 8/1973 Bruden ............................... 179/1 HF
3,963,868 6/1976 Randmere et al. ................ 179/1 HF Primary Examiner—Kathleen H. Claffy
Assistant Examiner—E. S. Kemeny
Attorney, Agent, or Firm—Flehr, Hohbach, Test, Albritton & Herbert

[57] ABSTRACT

In this speakerphone the peak value of the microphone output must be above the (variable threshold) average value to cause switching to transmit mode, thus providing dynamic compensation for ambient noise. In addition, a feedback path rapidly reduces the average value threshold if ambient noise such as a fan suddenly stops to cause the average value to be momentarily larger than the peak.

3 Claims, 3 Drawing Figures

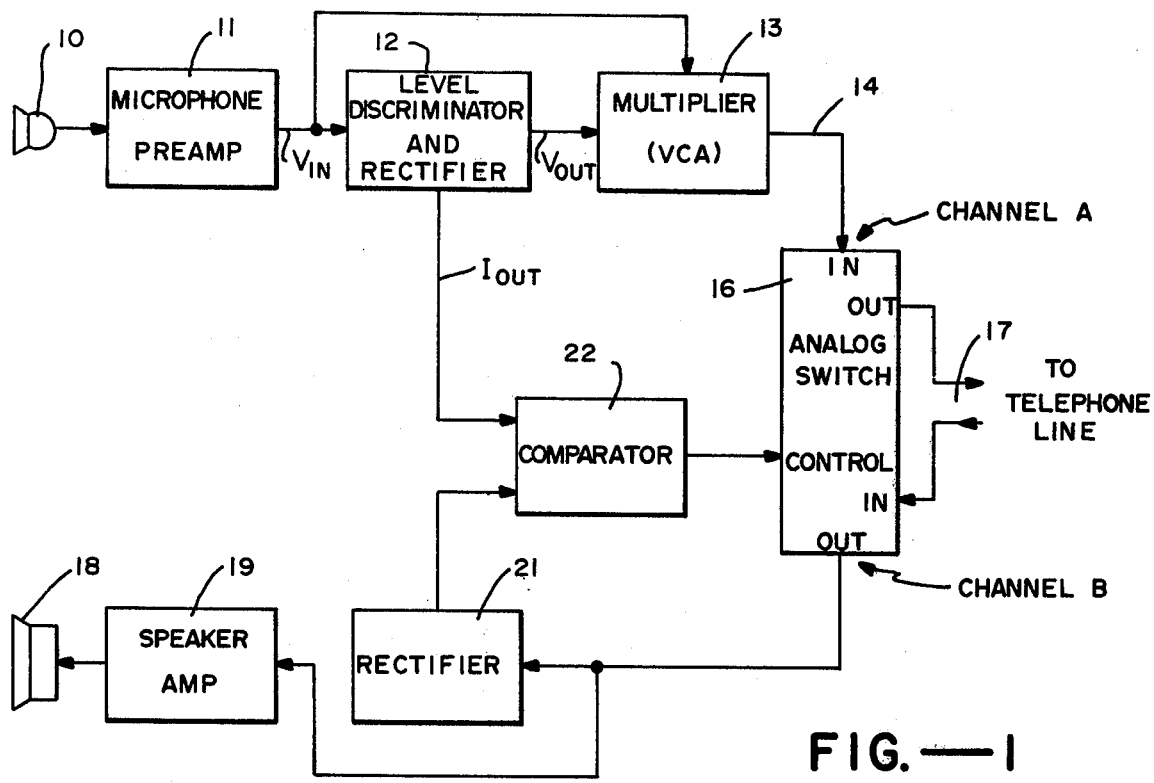
FIG.—1
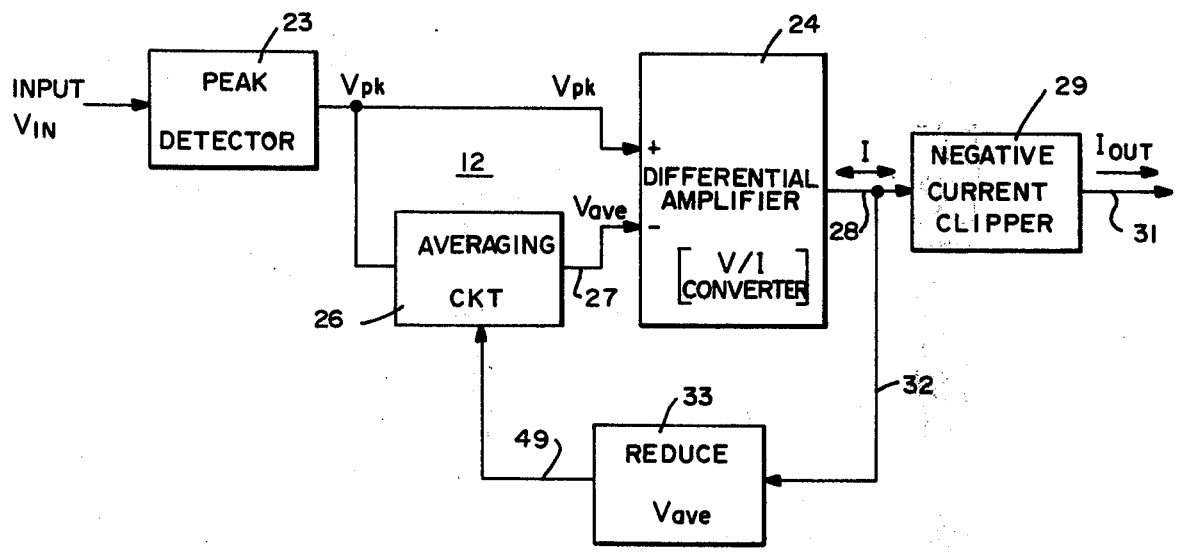
FIG.—2

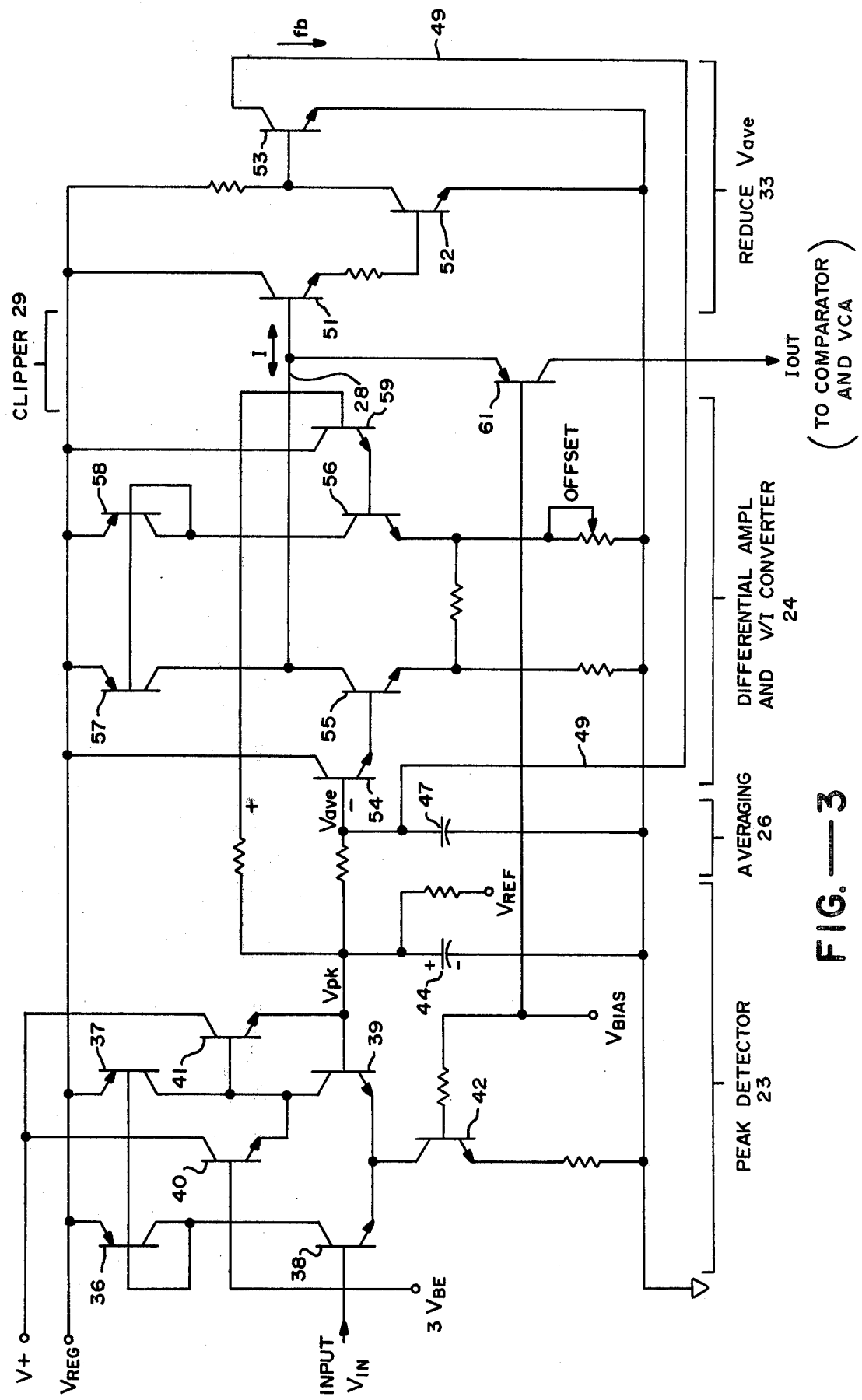
FIG.—3

4,147,892

SPEAKERPHONE WITH DYNAMIC LEVEL DISCRIMINATOR

BACKGROUND OF THE INVENTION

The present invention is directed to a speakerphone for use with a telephone system and more specifically with a speakerphone which has a dynamic level discriminator in the microphone channel.

In a typical speakerphone system in order to prevent feedback between the microphone and loudspeaker it is necessary to provide a switching circuit to alternately control the microphone channel and the speaker channel. This is usually done by appropriate rectifiers which sense the audio signal level of either channel and connect the channel with the maximum audio signal to the telephone line or communications link.

In addition such circuits, in order to distinguish the noise from an audio signal in the microphone channel, may include a fixed threshold level in the microphone channel above which the speech level must be in order to be effectively transmitted. Such a system is inadequate where either the ambient noise is quite high, which might cut out the speaker channel completely, or where the audio signal itself varies widely in its peak levels. In other words, there is a basic problem between distinguishing audio signal amplitude which is desired to be transmitted with ambient noise signals.

OBJECTS AND SUMMARY OF THE INVENTION

It is therefore an object of the present invention to provide an improved speakerphone system.

It is a more specific object to provide a speakerphone as above which has an improved microphone channel level detection circuit which provides for better channel switching.

In accordance with the above objects there is provided a speakerphone having a microphone channel, a speaker channel and switching means for alternately connecting such channels to a communications link. The peaks of an audio signal in the microphone channel are sensed and also averaged. Differential means indicate peaks greater than the average. A comparator is included in the switching means which is responsive to the differential means indication of the peaks being greater than the average to connect the microphone channel to the link. Means are also provided which are responsive to peaks less than the average for rapidly reducing the average value whereby under normal speaking conditions the peaks are greater than the average.

BRIEF DESCRIPTION OF THE DRAWINGS

FIG. 1 is an overall block diagram of a speakerphone system embodying the present invention;

FIG. 2 is a detailed block diagram of a portion of FIG. 1; and

FIG. 3 is a circuit schematic of FIG. 2.

DETAILED DESCRIPTION OF THE PREFERRED EMBODIMENT

The overall speakerphone system is illustrated in FIG. 1 which provides a two-way communication on a communications link which may be a telephone line or a radio frequency link. It includes a microphone channel A and speaker channel B. In the microphone channel there is included a microphone 10 for picking up user speech, a preamplifier 11 for the microphone and a level discriminator and rectifier 12 which in general senses the peak levels of the audio signal and controls the switching as will be described in detail below. The multiplier or voltage controlled amplifier (VCA) 13 receives both the output of microphone preamplifier 11 and level discriminator 12 to provide on its output line 14 an amplified audio signal received from microphone 10. This is received by an analog switch 16 and connected to the telephone line or communications link 17.

In channel B a loudspeaker 18 in combination with an associated amplifier 19 is connected to the telephone line 17 through switch 16 and reproduces the incoming signal. A rectifier circuit 21 also receives such signal and couples it to a comparator 22 which has, as its other input, a signal from level discriminator 12 to provide for alternate switching between channel A and B by analog switch 16.

In general operation, and this is typical of any speakerphone system, when there are no audio voltages present either from the telephone line 17 or from the microphone preamplifier 11, this is the "rest" state. Here comparator 22 normally provides a control input to the analog switch 16 to connect the telephone line 17 to the speaker channel B 18. If there is audio originating on telephone line 17, rectifier 21 detects this and applies a dc voltage to comparator 22 to keep the system in this state even though there may be a subsequent voltage from the microphone preamp 11. In other words this makes it more difficult for the other channel to gain control.

If there is no audio voltage on the telephone line and speech or an audio signal is present at microphone 10, an audio voltage will be present at the output of microphone preamplifier 11. Level discriminator and rectifier 12 detects this and applies the dc voltage to the comparator 22. If this voltage exceeds a small threshold, the comparator will switch to its other state causing analog switch 16 to connect telephone line 17 to the microphone channel A. If speech at the microphone stops, the system reverts back to its "rest" state where the speaker channel B is connected to the telephone line 17.

As thus far described, this is a typical speakerphone system.

In accordance with the present invention, the level discriminator and rectifier 12 is shown in greater detail in FIG. 2. The input voltage from microphone preamp 11, $V_{in}$, drives a peak detector 23 which has an output voltage $V_{pk}$ which in turn is connected to a differential amplifier with voltage to current converter 24 (and more specifically its positive input terminal) and an averaging circuit 26. The output, $V_{ave}$, of the averaging circuit 26 on line 27 is connected to the negative terminal of differential amplifier 24 and thus the difference between the two inputs appears at the output 28. This output current designated I is connected to a negative current clipper 29 which allows only the passage of positive currents and provides the signal on line 31, $I_{out}$, which is also illustrated in FIG. 1 as driving comparator 22 and VCA 13.

In addition, a feedback signal on line 32 (connected to output 28) drives a Reduce $V_{ave}$ unit 33 which in response to a negative output on line 28 (that is, where $V_{ave}$ is greater than $V_{pk}$) reduces the average stored in unit 26 to $V_{pk}$. Such a reduction might be necessary where, for example, ambient noise such as a fan or air conditioner suddenly stops.

In general the level discriminator and rectifier of FIG. 2 is for the purpose of effectively regulating the switching of audio switch 16 via comparator 22 when the audio signal detected by microphone 10 is also accompanied by ambient noise; in addition, it accommodates an audio signal with a large dynamic range.

In operation the level discriminator and rectifier of FIG. 2 has a rise of time of 5 milliseconds and a decay time of 200 millisceonds.

The foregoing level discriminator is important in providing for a dynamic operation of the system in adequately distinguishing between the audio speech level and ambient noise. For example, where ambient noise is quite high, if the speech level still exhibits peaks above the ambient noise level, which would typically be of a fairly constant nature such as an air conditioner steady state noise, differential amplifier 24 will sense this providing a positive output current on its output 28 and thus speech is still effectively communicated. This is compared to a prior art speakerphone where if a fixed minimum average threshold is exceeded by ambient noise, the speaker channel would be cut off completely. Thus the dynamic adjustment of the noise immunity feature of this speakerphone is provided.

If the ambient noise is suddenly reduced (and thus the speaker providing the audio signal may reduce their volume level), a negative current would appear at output 28 since momentarily $V_{ave}$ would be greater than $V_{pk}$; but the control of the microphone channel will not be transferred since the averaging circuit 26 immediately will reduce $V_{ave}$ to be equal to $V_{pk}$.

Yet another feature of the invention and referring to FIG. 1 is that since the output of level discriminator 12 drives the voltage controlled amplifier 13, when the speakerphone is being transferred to the speaker channel B a sharp cutoff is prevented.

FIG. 3 is the specific circuit of FIG. 2 with each of the corresponding units being bracketed and having the same reference numeral. Peak detector 23 includes transistors 36 through 42. The base of transistor 38 receives the input signal, $V_{in}$. The output $V_{pk}$ is provided on the emitter of transitor 41. A regulated voltage $V_{reg}$ is connected to the emitters of transistors 36 and 37. A bias voltage $3V_{be}$ supplied to the base of transistor 40 is utilized to maintain the associated transistor 39 out of saturation for normal signal levels. Transistor 42 biases the peak detector at approximately 10 microamperes. A capacitor 44 connected between the $V_{pk}$ output and ground in combination with a resistor 46 connected to $V_{ref}$ provides for the proper rise time and decay time discussed above.

Averaging circuit 26 includes the capacitor 47 and resistor 48. It is controlled by a feedback on line 49 from reduce $V_{ave}$ unit 33 which includes the transistors 51, 52 and 53. If $V_{ave}$ is greater than $V_{pk}$, then these transistors serve to discharge capacitor 47 thus reducing $V_{ave}$ which is the base input of transistor 54.

Transistor 54 is a portion of differential amplifier and voltage to current converter 24 which also includes transistors 55 through 59. Its other input is the base of transistor 59 which is $V_{pk}$. The output, I, is taken from the collector of transistor 55 which is specifically line 28.

Clipper 29 which allows only the passage of positive current consists of transistor 61 which is biased (along with transistor 42 of peak detector 23) with $V_{bias}$. This allows only positive current to flow, referring to FIG. 1, to the comparator 22.

Thus an improved speakerphone has been provided.

What is claimed is:

1. A speakerphone having a microphone channel, a speaker channel, and switching means for alternately connecting such channels to a communications link comprising: means for sensing peaks of an audio signal in said microphone channel; means for averaging said peaks; differential means for indicating peaks which are greater than said average; a comparator included in said switching means responsive to said differential means indication of said peaks being greater than said average in said microphone channel for connecting such channel to said link; means responsive to peaks less than said average for rapidly reducing the average value whereby under normal speaking conditions said peaks are greater than said average.

2. A speakerphone as in claim 1 where said means for sensing peaks has a predetermined rise time and decay time.

3. A speakerphone as in claim 1 where said microphone channel includes a voltage controlled amplifier for amplifying audio signals from a microphone and is also responsive to said indication of said differential means.

* * * * *